United States Patent
Salokhe et al.

(10) Patent No.: US 10,846,327 B2
(45) Date of Patent: Nov. 24, 2020

(54) VISUAL ATTRIBUTE DETERMINATION FOR CONTENT SELECTION

(71) Applicant: A9.com, Inc., Palo Alto, CA (US)

(72) Inventors: Abhimanyu Salokhe, Union City, CA (US); Minghua Guo, Mountain View, CA (US); Eusebius Lai, Sunnyvale, CA (US)

(73) Assignee: A9.COM, INC., Palo Alto, CA (US)

( * ) Notice: Subject to any disclaimer, the term of this patent is extended or adjusted under 35 U.S.C. 154(b) by 106 days.

(21) Appl. No.: 16/179,708

(22) Filed: Nov. 2, 2018

(65) Prior Publication Data

US 2020/0142978 A1    May 7, 2020

(51) Int. Cl.
   *G06F 16/583*    (2019.01)
   *G06N 20/00*     (2019.01)
   *G06K 9/32*      (2006.01)
   *G06K 9/62*      (2006.01)

(52) U.S. Cl.
   CPC ...... *G06F 16/5854* (2019.01); *G06F 16/5838* (2019.01); *G06K 9/3241* (2013.01); *G06K 9/6267* (2013.01); *G06N 20/00* (2019.01)

(58) Field of Classification Search
   CPC .............. G06T 19/20; G06T 2210/16; G06T 2219/2021; G06T 15/205; G06T 11/001
   See application file for complete search history.

(56) References Cited

U.S. PATENT DOCUMENTS

| | | | | |
|---|---|---|---|---|
| 5,627,915 A | * | 5/1997 | Rosser | G06K 9/6282 |
| | | | | 382/219 |
| 6,031,935 A | * | 2/2000 | Kimmel | G06K 9/48 |
| | | | | 382/170 |
| 6,188,777 B1 | * | 2/2001 | Darrell | G06K 9/00362 |
| | | | | 348/169 |
| 6,817,982 B2 | * | 11/2004 | Fritz | A61B 8/0858 |
| | | | | 382/128 |
| 8,180,112 B2 | * | 5/2012 | Kurtz | G06K 9/00288 |
| | | | | 382/108 |

(Continued)

OTHER PUBLICATIONS

International Search Report and Written Opinion issued Application No. PCT/US2019/057683 dated Dec. 20, 2019.

(Continued)

*Primary Examiner* — Yosef Kassa
(74) *Attorney, Agent, or Firm* — Hogan Lovells US LLP

(57) ABSTRACT

Content can be located for items that are stylistically similar to an item of interest. The item of interest can be represented in a query image, which is analyzed to determine one or more regions having an item represented therein. The classification of the item is determined, enabling identification of a trained model to be used to process image data for the region(s) of the query image. The trained model outputs a set of attributes, relating to visual or stylistic attributes, and corresponding confidence or prominence values for the attributes. These attributes and values can be compared against a data repository to locate items determined to be similar based on corresponding attributes and values. A similarity determination algorithm can identify similar items and rank those items by similarity. Content for the most similar items is returned as a result for the query image.

16 Claims, 7 Drawing Sheets

(56) References Cited

U.S. PATENT DOCUMENTS

| | | | |
|---|---|---|---|
| 8,379,920 B2* | 2/2013 | Yang | G06K 9/00369 382/103 |
| 8,798,362 B2* | 8/2014 | Wang | G06K 9/00369 382/165 |
| 8,903,198 B2* | 12/2014 | Datta | G06F 16/532 382/305 |
| 9,753,949 B1* | 9/2017 | Malpani | G06F 16/24575 |
| 9,767,381 B2* | 9/2017 | Rodriguez-Serrano | G06F 16/54 |
| 10,043,109 B1 | 8/2018 | Du | |
| 2018/0075323 A1 | 3/2018 | Kouchnir | |

OTHER PUBLICATIONS

Lukas Bossard et al: "Apparel Classification with Style", Nov. 5, 2012 (Nov. 5, 2012), Computer Vision ACCV 2012, Springer Berlin Heidelberg, Berlin, Heidelberg, pp. 321-335, XP047027192, ISBN: 978-3-642-37446-3 the whole document.

* cited by examiner

VISUAL ATTRIBUTE DETERMINATION FOR CONTENT SELECTION

BACKGROUND

Users are increasingly consuming content electronically, such as by accessing digital content provided over the Internet or another such network. Users often rely upon search queries or keyword strings that can be used to identify potentially relevant content. In many instances, however, the relevance depends at least in part to the actual query that was submitted, as well as the way in which the potentially relevant content is categorized or identified. Some applications allow for image-based search, where a user can submit an image and obtain content related to an object in the image. Such an approach typically utilizes conventional computer vision techniques to recognize a specific item represented in the image, such as by comparing against visual features of other images previously analyzed. Such an approach utilizes the similarity of the images and not attributes of the objects represented therein.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing content in an electronic environment. In particular, various embodiments enable search results or other content to be determined based upon various visual and/or stylistic attributes. In some embodiments, a query image is received that includes a representation of at least one item of interest. The query image can be analyzed using a localizer to determine regions that correspond to potential items, such as may be based upon unique features in the image that correspond to various item patterns or representative vectors. These regions of image data can be analyzed using a classifier to attempt to determine a classification, type, or category of item represented in that region. Once a category has been determined, a machine learning model or other statistical prediction algorithm trained on data for that category can be used to process the image data for that region. The trained model can accept the image data for the region as input, and output a set of attributes and values. The attributes can be visual or stylistic attributes that were determined to be exhibited by the representation of the item in the image region. The values can be confidence or certainty values for those elements, or can represent a prominence of the attributes in the image, among other such options. The set of attributes can be used to generate an attribute or feature vector in some embodiments, while the set of attributes and values can be used in others. These values or vectors can be compared against a set of similar types of values or vectors that were generated for other items, which are indicative of attributes and values for those items. A similarity determination algorithm can be used to identify similar items to the item represented in a specific region of the query image, and in some embodiments the items can be ranked by similarity scores. Content for at least a subset of the most similar items can then be returned as results for the query image, which can enable additional information to be obtained about those items or enable those items to be obtained by a customer, etc.

Various other functions can be implemented within the various embodiments as well as discussed and suggested elsewhere herein.

Figure 1A:
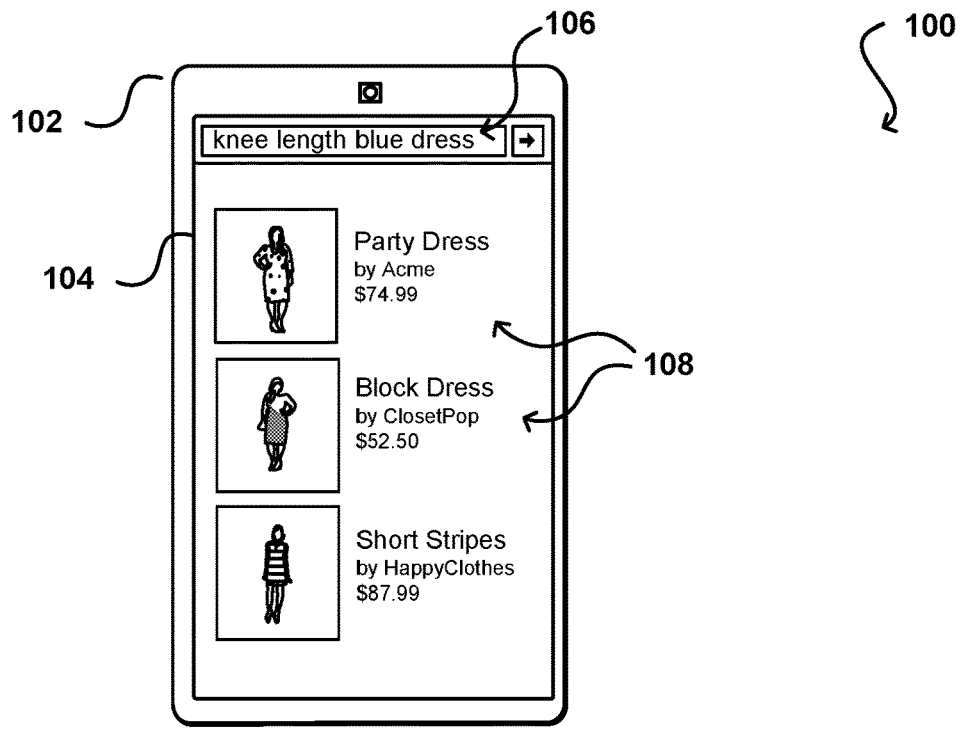
FIGS. 1A and 1B illustrate selections of content that can be determined and provided in accordance with various embodiments.

FIG. 1A illustrates an example display of content 100 on a display screen 104 of a computing device 102. In this example a search query 106 has been received and a set of search results 108 determined and returned for presentation in response to the request. There are many conventional methods that can be used to locate content in such a way, and these will not be discussed herein in detail. In this example the user has submitted a query including the keywords or text query "knee length blue dress" and the returned search results 108 have been determined to be relevant in some way to the keywords. This can be due to a categorization of the results, keywords associated with the results, or tags applied to the result, among other such options. The user can scroll or otherwise navigate through the results to determine whether any of the results are of interest to the user.

As illustrated, the search results 108 returned are all within a dress category, but otherwise vary widely in their style and visual appearance. This can be due to the fact that the results can include any dress, or dress-related result, that has been associated with the color blue and the words "knee" and "length." These results do not relate to a specific style of dress, or any of a variety of visual attributes, and thus may include many results that are not of interest to the user. Because the terms search can come from a description, dresses would be returned that include descriptions of "above the knee" or "below the knee" with "long length" or "short length," and the term length may relate to any aspect of the dress. In fact, a dress that talks about knees or any length may appear in the results as being at least somewhat related to the query. If the user has a specific style of dress in mind, it may be difficult to obtain dresses of that style without a lot of experimentation with various queries, and even then the accuracy of the results will be limited in part by the words used in the description of, or otherwise associated with, the items.

As mentioned, in some systems or applications a user may submit an image that is to function as a query, otherwise known as a query image. A computer vision process can attempt to identify unique or representative features of the query image, and use these features to locate matching images. The match will be based upon the placement and relationship of the features in the image, and can be impacted by factors such as pose, angle, model, and the like. Thus, two images of the same item may not be determined to be similar if the views of the item in the images are very different. Such approaches to not attempt to determine visual aspects of the item itself, or style information for the item, and attempt to locate items based on a similarity of the visual aspects or determined style.

Accordingly, approaches in accordance with various embodiments attempt to determine style information, or other visual attributes, of items represented in query images or other image data provided for analysis. A query image can be analyzed to attempt to identify regions containing potential items of interest, and those regions can be analyzed using a classifier to determine a type of item represented in each image. For each class of item, a trained machine learning model, or other such process or algorithm, can be used to analyze the corresponding image region to identify visual attributes of the item. These can include attributes relating to length, color, pattern, cut, width, shape, hemline, neckline, silhouette, occasion type, and the like. The model can also produce confidence values or attribute scores for each region, such as where an item might be 50% blue and 50% white, or where the item might be determined to have a length of halfway between the knee and the ankle with a confidence of 85%, among other such options. Once the set of attributes and corresponding confidence values is determined, the attributes and values can be used to locate items having similar attributes and values, as may have been determined manually or through use of the same trained model, among other such options. When a set of items having similar attributes and values is determined, at least a subset of the most similar items can have content provided to the user, such as may enable the user to obtain information about those items, view representations of those items, or purchase those items, etc.

Figure 1B:
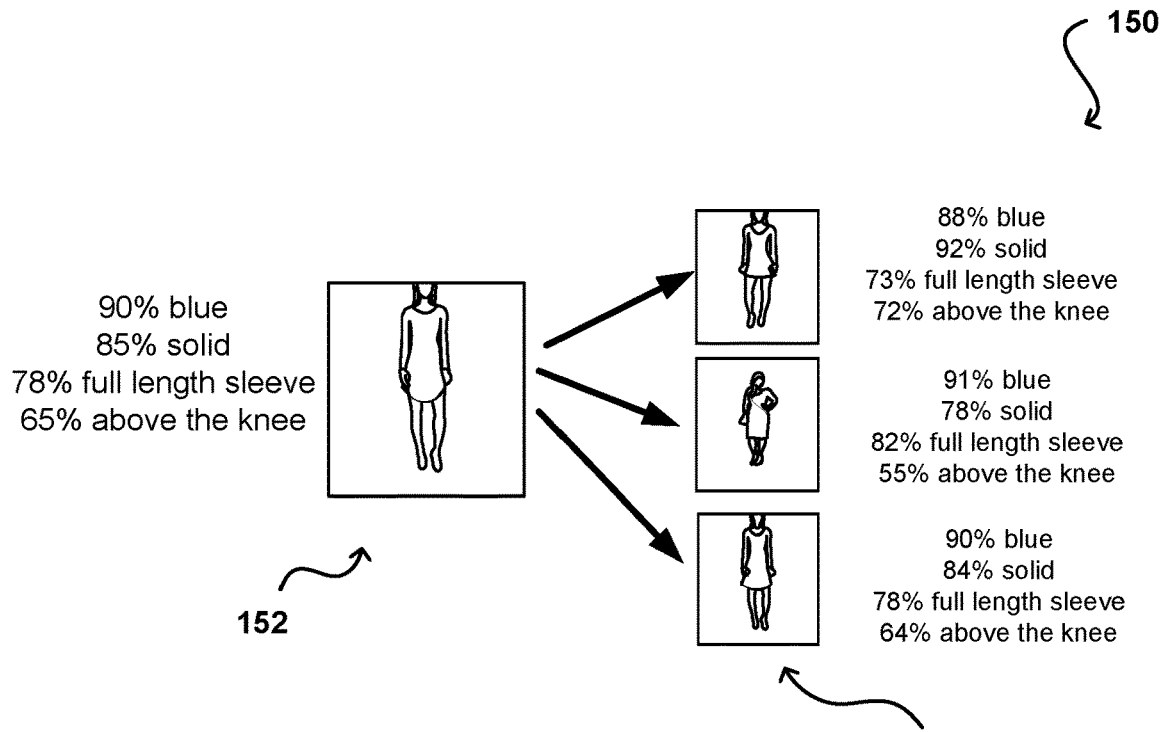

FIG. 1B illustrates an example search result 150 that can be determined in accordance with various embodiments. In this example a query image 152 is received that includes a representation of a dress. The query image can be analyzed using a process discussed herein to determine the relevant attributes and the associated confidence values. In this example, the query image was determined to have four primary or dominant attributes, at least out of the set of attributes for which the model was trained. As discussed, each attribute has a confidence level output by the model as well. In this example, the attributes and confidence values indicated that the item represented in the query image is 90% blue, 85% solid, 78% full sleeve, and 65% above the knee. It should be understood that various other attributes could be determined for the example query image as well, and that other values or formats can be output for each attribute by the model as well within the scope of the various embodiments. Once the attributes and values are determined, a data store including attribute and value information for various items can be analyzed to locate items having similar attributes and values. A similarity function can be used in some embodiments that generates similarity scores for various items based on the attribute and confidence values, and then ranks the items by similarity scores. Content for at least a subset of the similar items can then be provided for presentation to the user, such as up to a determined number of highest ranked items. In this example, content 154 for three items is provided, where each of those items has a very similar style to the item in the query image based at least on the determined attributes and values. This can be very useful for a user who views an item of interest, and wants to obtain information about that item or items having a similar style or visual appearance. The number of items for which content is returned can vary, such as by the number of items having at least a minimum similarity score or satisfying a similarity score threshold, among other such options.

In some embodiments, a graph database is used to build a knowledge graph consisting of item identifiers, attributes (including both item and visually detected attributes, for example), and their relationships to each other. Such data provides for the dynamic determination of items having a given combination of attributes with similar confidence values or other such metrics. As mentioned, such information can provide for a style-based search service, for example, where items can be located that have the same visual, audio, or other inspirational attributes and overall style, without the need to focus on retrieving specific matches for user queries. An additional advantage of such an approach is that the process can quickly adapt to changing trends and styles without the need to re-index, re-learn, or re-label the various items. This adaptation can also occur without manual human intervention.

An advantage of the graph data is the ability to perform and compare these weighted relationships. For example, it can be determined that a dress is "60% striped," or "30% blue, 30% green, 40% white." These values enable items with similar attributes to be located through use of these scored attributes from the query image. Such an approach also enables items to be retrieved or selected using information for styles that have not been previously encountered or learned. For example, if a customer presents an image of a Bohemian style dress for search, and the system has not learned what makes up a Bohemian style, content for similar items can still be retrieved by detecting, for example, a 40% floral pattern, 80% ruffle, 60% loose fitting, and 80% hemlength as indicated in the Bohemian query image. The confluence of weighted known attributes allows the system to retrieve similar styles. As additional attributes are learned or detected, the results will improve accordingly. The various weighted relationships enable the system to blend the known attributes to approximate various unknown attributes as well in at least some embodiments.

In some embodiments, a knowledge graph enables such a system to generate additional keywords through attribute-to-attribute relationships. For example, a team of editors can augment the known attributes with synonyms, hierarchies, and taxonomies. This can enable the system to generate an improved selection of keywords after detecting the known attributes. A knowledge graph can also enable the system to store item-to-item relationships through similarity data. This can enable the system to leverage those relationships to help the user find additional similar items. The user may then select multiple items from a search results page, for example, and using those seed identifiers the system can surface the confluence of similar items, and can produce a cloud of weighted attributes associated with those items to produce a more refined weighted attributes query given the seed items and their confluence of similar items, in order to surface content for even more items. Such a process can repeat itself as the user indicates items in which the user is interested, and the search results should converge towards a set matching the style the user is seeking.

Such an approach can be useful for any type of item where there may be many options available, and a user can specify a specific style or set of attributes that are of interest. This may be particularly relevant for items such as clothing or furniture, where there may be many variations of a type of item available with varying sets of attributes, as well as weights or amounts of that attribute. For example, an item might have the colors red and blue, which might match specific attributes, but might also be 30% red and 70% blue, and thus may provide a better match if the confidence or relevance value can be determined and matched as well. Yet a better style match can be obtained if a pattern can be determined, such as where the item might be primarily blue but with red stripes or patterned features. While a user can attempt to obtain such a match using keywords alone, as discussed above, the ability to match to a specific style can provide for a much more accurate match that can be obtained much more quickly. Further, such an approach does not rely on proper text labeling or description that may need to be updated over time. A user might see an item of interest in person and capture an image of the item using a camera of a portable device, for example, or might come across an image including a representation of that item on a website or social media page, among other such options. The user can then cause this image, or a set of such images, to be analyzed to obtain the relevant content. As mentioned, this can include descriptive content about the items, or the ability to purchase items of similar style, etc. Such an approach also can allow for some variety, as a straightforward image match would return items that look exactly the same, instead of similar items of a similar style, but that might have other differing attributes that may be preferable to the user.

Figure 2:
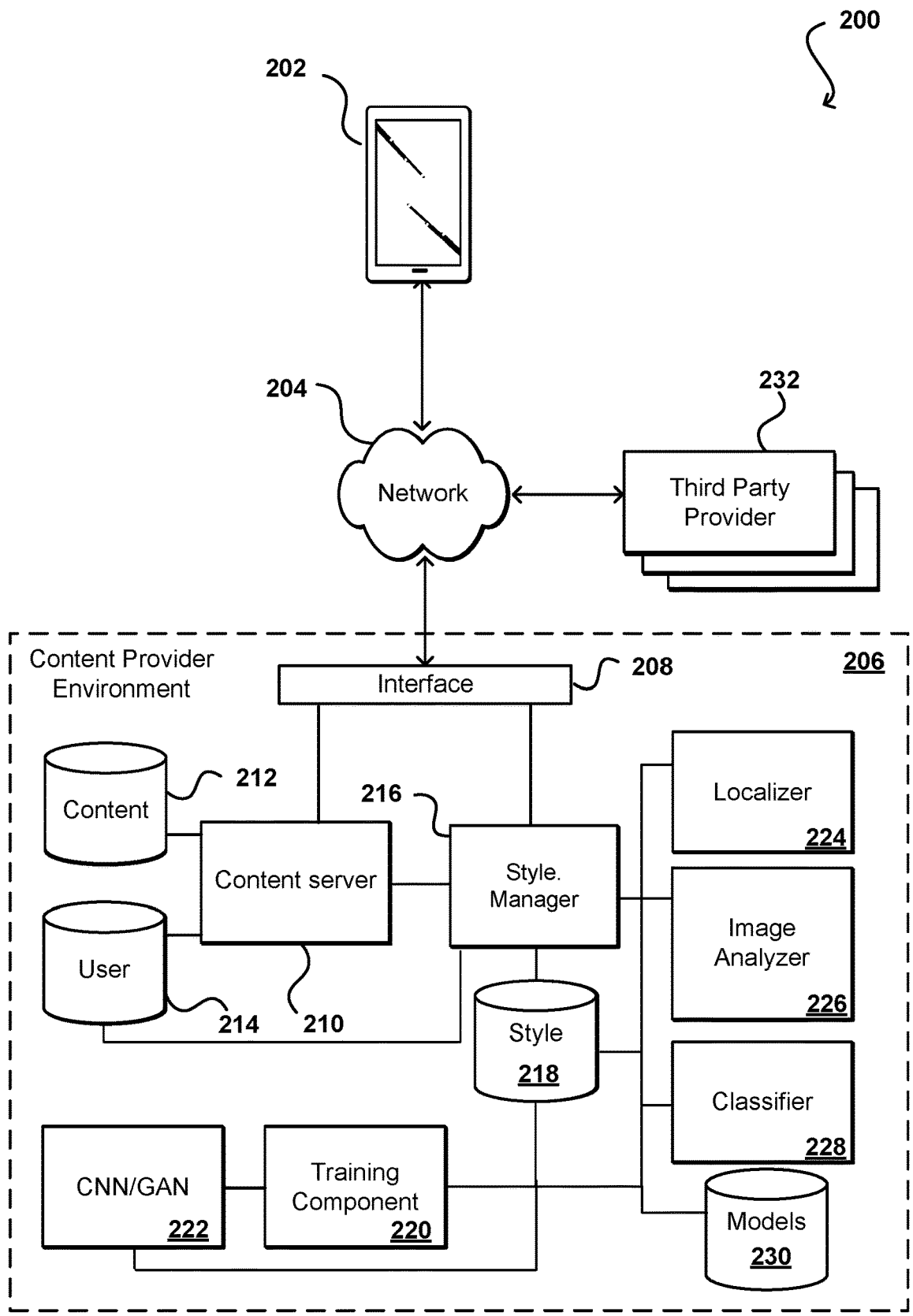
FIG. 2 illustrates an example system that can be utilized to examine query images and determine corresponding content in accordance with various embodiments.

FIG. 2 illustrates an example environment 200 in which aspects of the various embodiments can be implemented. In this example, a computing device 202, such as a portable computing device of a user, is able to make a call or request across one or more networks 204 to a content provider environment 206. It should be understood, however, that in some embodiments some or all of the functionality may be performed on the computing device itself. The network(s) can include any appropriate network, such as the Internet, a local area network (LAN), a cellular network, an Ethernet, or other such wired and/or wireless network. The content provider environment 206, which can include any appropriate environment in which physical resources such as servers and databases are located and able to serve content, can include various types of resources for providing content from, or at least stored by, a resource provider, or other such entity.

In this example, a request received to the content provider environment 206 can be received by an interface layer 208 of the environment. As known for network environments, the interface layer can include components such as interfaces (e.g., APIs), load balancers, request and/or data routers, and the like. If the request is a request for content, such as for content for a page to be displayed in an application or browser, information for the request can be directed to one or more content servers 210 and/or content managers, which can obtain the content from a content data store 214 or other such repository to be sent back across the network(s) 204 to the computing device 202, or another indicated destination. In some embodiments, information for the request might also be compared against user data in a user data store 212 or other such location do determine, for example, whether the user has access rights to that content. In some embodiments user data might also be analyzed to determine which type of content to provide, additional supplemental content to provide with the primary content, and the like.

In various embodiments, the request may include or specify at least one query image, or other set of image data, to use to locate relevant content. In response to receiving such an image, the query image can be passed to a style manager 216, or other such system or service, that may be part of the environment or offered as a third party service, among other such options. The style manager can cause the query image to be processed in order to determine style data that can be used to locate relevant content. In this example, the image is passed to a localizer 224 or other such system or service, that is configured to analyze the image to determine regions or portions of the image, or image data, that might correspond to an item of interest. Various object recognition algorithms and processes can be used, which can generate bounding boxes, coordinate sets, or other values or mechanisms that can be used to identify regions of the image that may correspond to objects of specific types, as may include feature points that match various patterns or relationships. The coordinate or bounding box information in this example can be provided, with at least the relevant image data (or just the image data for the relevant portions) to a classifier 228 or other such system or service, that is able to analyze the image data for a specific region and classify the type of item represented in the image region, at least for known classifications of items. In various embodiments the classifier and localizer might be part of the same component, process, or service. The classifier can analyze the image data and recognize a class or type of item in each region, at least where such a classification can be determined with at least a minimum level of confidence or certainty. In some embodiments there may be multiple classifications in a given region corresponding to different types of items.

The classification data can be provided, with the region data, to an image analyzer 226. The image analyzer may include the localizer and/or classifier in various embodiments. The image analyzer can analyze the regions identified by the localizer and for which classifications were determined by the classifier. The image analyzer 226 can use the classification for a given region to determine a relevant algorithm or model to use to process the image data for that region. This can include, for example, using a trained neural network or other statistical model that has been trained using image data for items of that classification, and is able to identify specific attributes associated with that classification. For example, a neural network trained using labeled test data for dress images can identify attributes such as length, color, pattern, and shape, among others, that are associated with different dresses. The image analyzer can analyze the region classified as including a representation of a dress, and can provide as output a set of attributes and confidence values, for example, that were identified for that dress as represented in the image region.

Information such as the classification, set of attributes, and associated values can then be compared against data in a style repository, for example, that includes style data previously determined or various items. The style manager can then use a similarity determination algorithm or process to compare the data for the query image regions against data for items stored in the style repository. The process can produce a set of results indicating information for similar items, which were determined to have at least a minimum similarity score or value with respect to the query image. In some embodiments a ranking will be produced according to similarity score, and at least a top subset of the item data selected. The data for the items determined to be similar, such as may include a set of item identifiers, can be provided to the content server 210, which can then pull the relevant content from the content data store 212 to return to the client device 202. This may include, for example, image and description data for items determined to be similar according to the style attributes and associated values.

The individual attributes and values can be determined at least in part using neural networks 222 such as a conventional neural network (CNN) or generative adversarial network (GAN) to determine the appropriate attributes and values through training on an appropriate data set. A training component 220 can perform the training on the models and provide the resulting results and/or trained models for use in determining the individual attributes. In order to determine attributes for various content items, in at least some embodiments, some analysis of content items in an electronic catalog or other data repository is performed to determine information about the visual characteristics of the items. In some embodiments, one or more feature descriptors or vectors can be generated to describe various attributes of an image (such as brightness, formalness, etc.).

In the example shown in FIG. 2, a neural network 222 can be trained using, for example, images of objects. For CNN-based approaches there can be images submitted that are classified by attribute type, while for GAN-based approaches a series of images may be submitted for training that may include metadata or other information useful in classifying one or more aspects of each image. For example, a CNN may be trained to perform object recognition using images of different types of objects, then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. An example process for training a neural network for generating descriptors describing visual features of an image in a collection of images begins with building a set of training images. In accordance with various embodiments, each image (or pair of images) in the set of training images can be associated with an object label describing an object depicted in the image or a subject represented in the image. According to some embodiments, training images and respective training object labels can be located in a data store 618 that includes images of a number of different objects.

A training component 220 can utilize the training data set to train the neural network 222. As further described, neural networks can include several learning layers in their architecture. A query image from the training data set is analyzed using the neural network to extract a feature vector from the network before the classification layer. This feature vector describes the subject and/or objects shown in the image. This process can be implemented for each of the images in the data set, and the resulting object feature vectors can be stored in a data store. In various embodiments, the resulting object feature vectors can be compressed for improved processing. For example, the attributes generated by the neural network may include feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

Figure 3A:
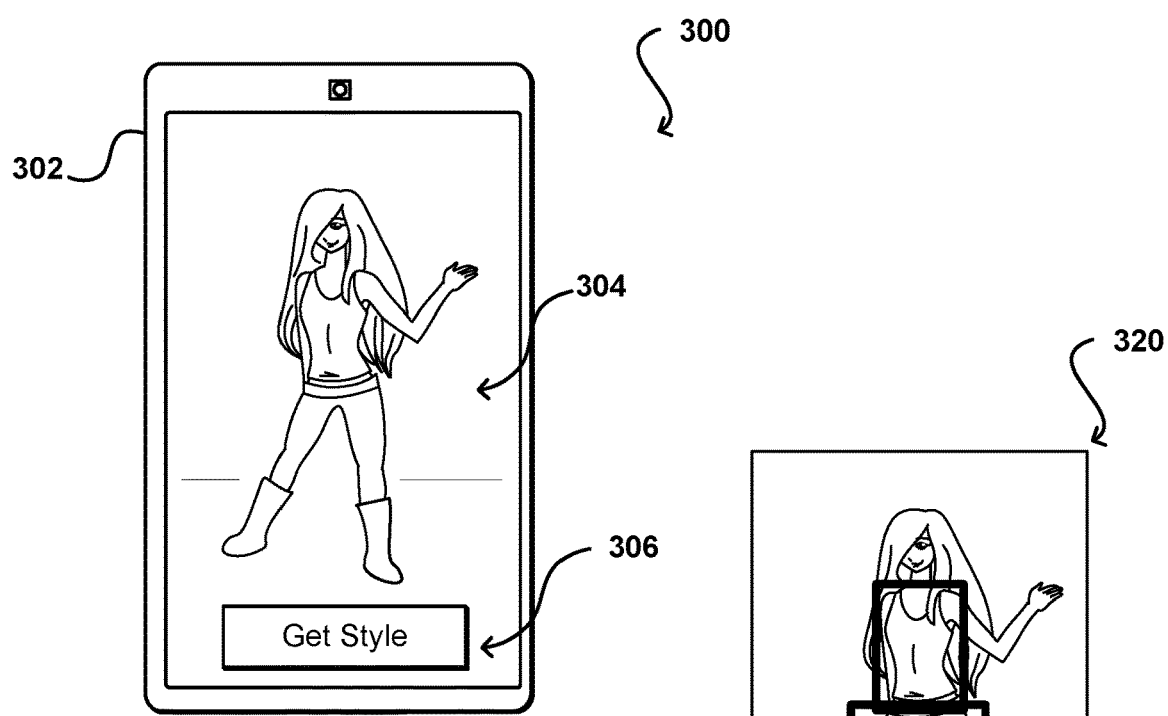
FIGS. 3A, 3B, and 3C illustrate an approach to providing content corresponding to items represented in a query image that can be utilized in accordance with various embodiments.
Figure 3B:
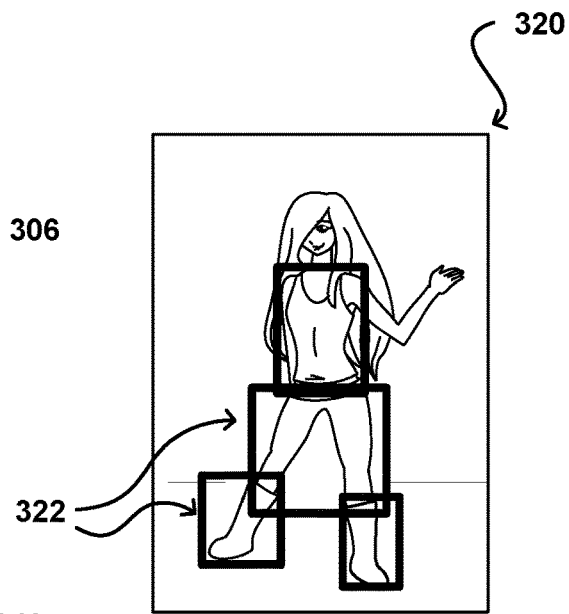
Figure 3C:
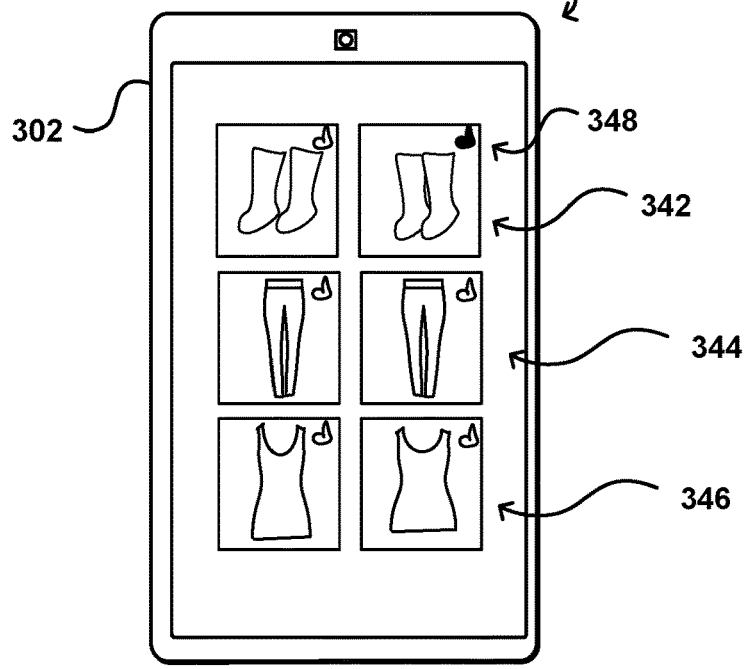

FIGS. 3A-3C illustrate an example flow that can be used to provide results in response to a query image in accordance with one embodiment. In the view 300 of FIG. 3A, a user has obtained an image 304 including a representation of one or more items of interest, in this example clothing items worn by a person or model. The user could have captured this image or obtained the image from any of a number of different sources. The user in this example, can indicate or provide the image then select an option 306 to obtain information about the items represented in the image. The query image will be submitted for analysis, such as by a remote service as discussed herein. As illustrated in the view 320 of FIG. 3B, the image data can be analyzed to identify a set or regions 322 of image data that correspond to potential items of interest. As mentioned, the image data for these regions can be analyzed to determine attributes for specific classes of items represented in those regions. That attribute and classification data can be used to locate items of those classifications, or similar or related classifications, that are determined to be similar or relevant based on the attribute and value data. As illustrated in the view 340 of FIG. 3C, content can then be provided for presentation or review for items determined to be similar to the items represented in the image. This can include content such as image and description data for similar boots 342, pants 344, and tops 346 that were analyzed in the query image. In some embodiments, a user can then purchase or obtain any or all of these items, which enables the user to quickly replicate a look or style that was represented in the query image. As discussed elsewhere herein in more detail, the content can also correspond to items determined to be relevant to the represented items, such as accessories or other items that are of the same style or otherwise related in some way to those items, that might be provided as potentially being of interest to the user as well.

In some embodiments, a user can have the option of specifying images that include attributes or values that are of interest to the user. For example, the user might have the option of selecting a "thumb's up" 348 or other graphical element associated with an image in order to indicate that the user likes that item. Attributes and values associated with that item can then be weighted more highly than other attributes and/or values. If a set of images are selected, the aggregate attributes and values can be analyzed to determine the attributes and values that are of most interest to the user, which can be used to adjust the rankings or scores for the various items accordingly. In some embodiments there may also be thumb's down or other rating icons or elements that can enable various attributes to be adjusted or weighted accordingly. There may be other ways for users to indicate preferences for specific attributes as well, such as to adjust sliders or other interface elements presented for identified attributes, where the user can receive updated result in response to adjusting one or more attributes or values, among other such options.

Figure 4:
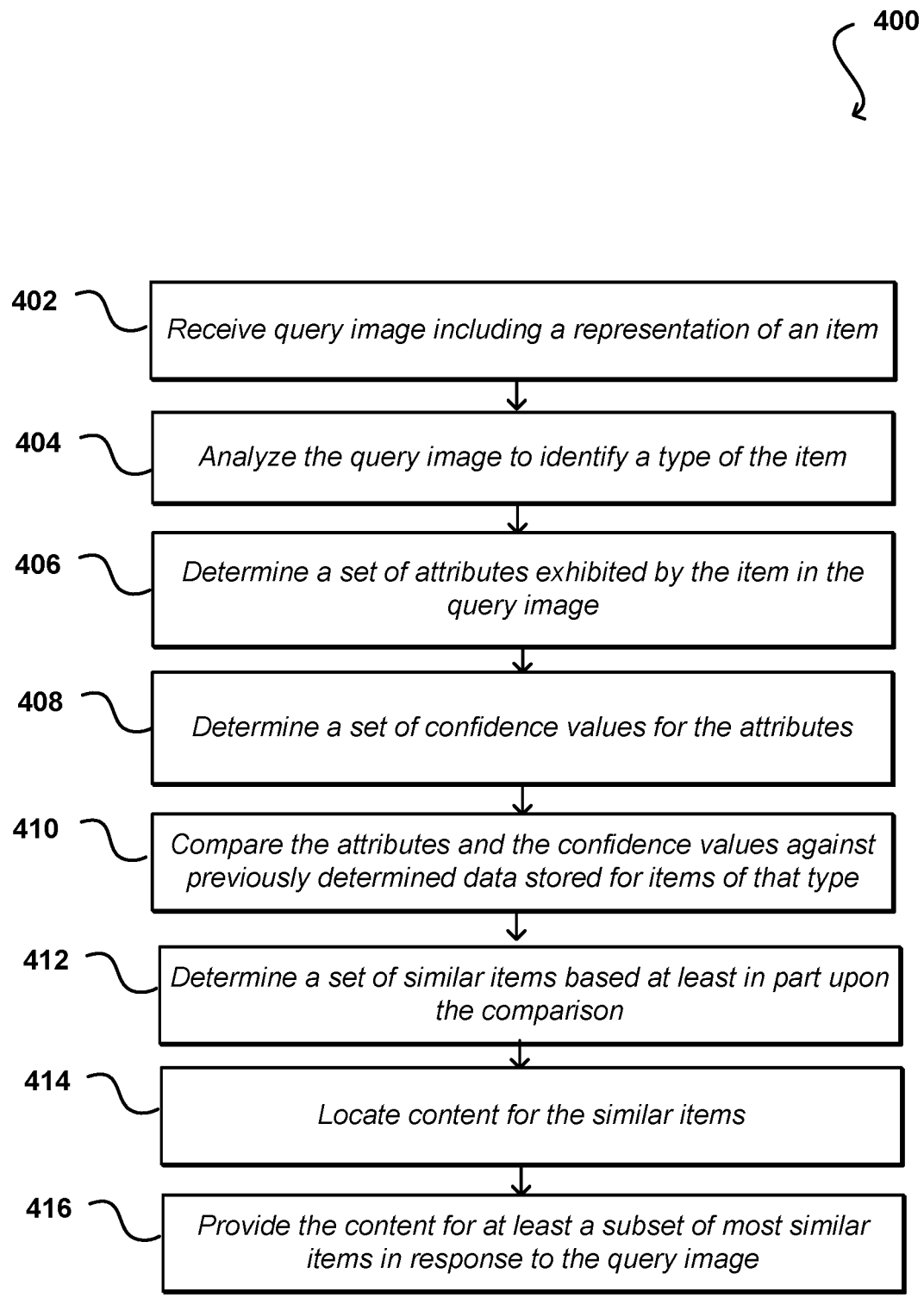
FIG. 4 illustrates an example process for performing a style-based search for content that can be utilized in accordance with various embodiments.

FIG. 4 illustrates an example process 400 for locating content for similar items that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a query image is received 402 that includes a representation of an item. In this example, the query image includes an item of interest to an entity that provided the query image. The query image may have been uploaded from an application or webpage or otherwise provided as discussed herein. The query image can be analyzed 404 to determine a type of the item represented. This can include, for example, determining one or more regions including potential items and then analyzing those regions with a classifier or computer vision algorithm, among other such options. The output can be a classification, item type, or other categorization of the item. Based at least in part upon the classification, a set of attributes exhibited by the item in the query image can be determined 406. This can be due to the model used to determine the attributes being category specific, or can be due to the selection of attributes for which to search being category-specific, among other such options. The attributes in many embodiments will relate to one or more visual aspects of the item, as may relate to color, pattern, cut, shape, length, etc. A set of confidence values, or other certainty or prominence values, etc., can be determined 408 for the attributes. This can be output from the same model in some embodiments, and may be obtained in the same step as well. The values may indicate a confidence in a certain attribute, such as 85% confidence that a shirt is a polo shirt, or a prominence of that attribute, such as a shirt being 74% red. The attributes and values can be compared 410 against similar values previously determined for items represented in other images, in some embodiments determined using the same trained model for items of that type. A set of similar items can be determined 412 based at least in part upon the comparison, where similarity values can be compared between the item of the query image and the identified items. In some embodiments the items can be ranked by their respective similarity scores. In some embodiments, the similarity may represent a stylistic similarity determined using visual attributes. Once a set of similar items is identified, content for those items can be determined, where the content can include any appropriate types of content such as image, video, audio, media, text, descriptive, augmented reality, or virtual reality content, among others. At least a subset of the content can be provided 416 for presentation in response to the query image, where the content can be provided for at least a subset of the most similar items.

Figure 5:
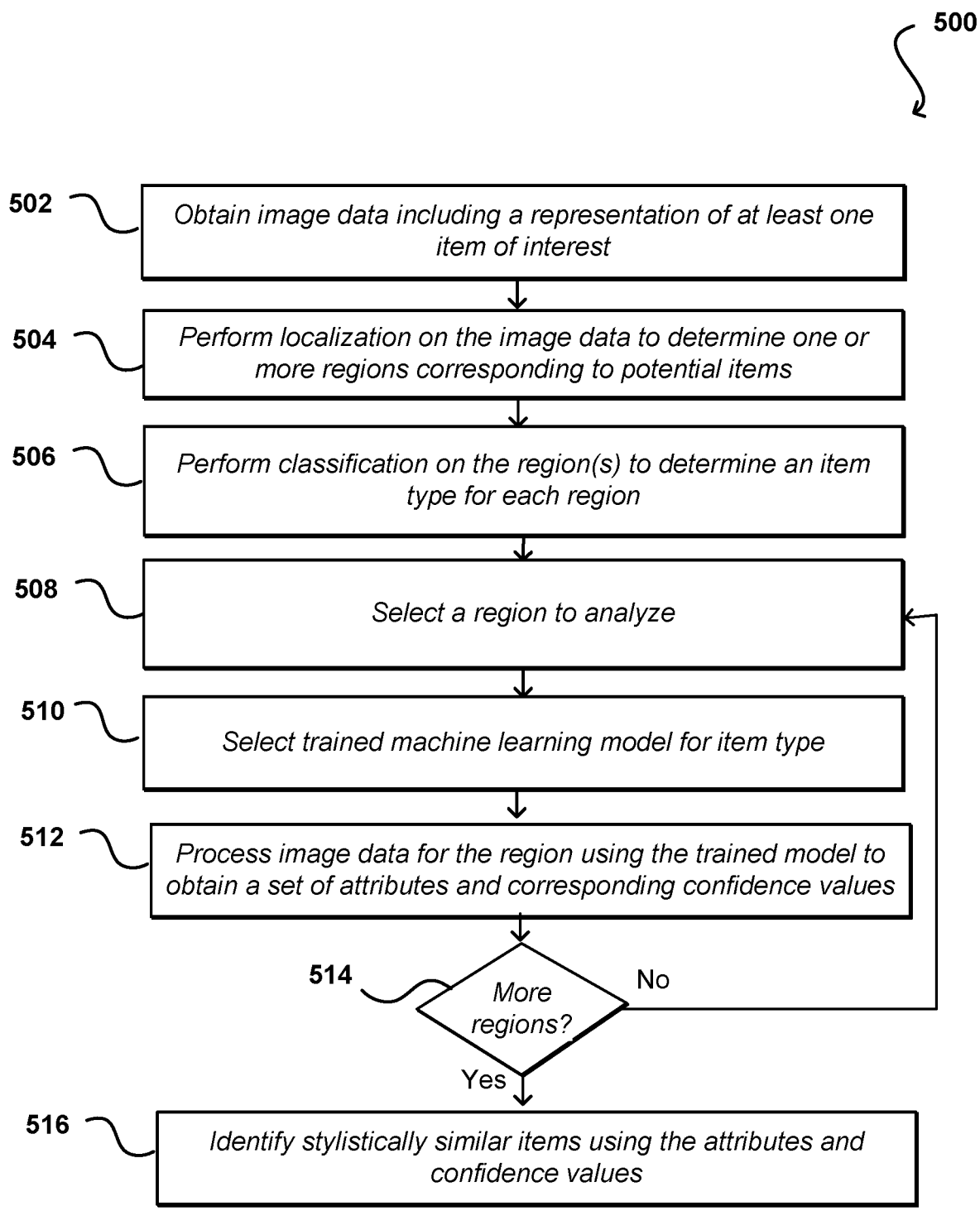
FIG. 5 illustrates an example process for determining a set of stylistic attributes for an item represented in an image that can be utilized in accordance with various embodiments.

FIG. 5 illustrates an example process 500 for identifying stylistically similar items that can be utilized in accordance with various embodiments. In this example, image data is obtained 502 that includes a representation of at least one item of interest. Localization is performed 504 on the image data to determined one or more regions corresponding to potential items. This can include, for example, using a localization algorithm to identify regions with patterns of unique features that match those of at least certain types of items for which the localizer is trained. Classification can then be performed 506 on the identified regions in order to attempt to determine an item type of each region. For example, a region might be processed using a classification algorithm, which can use the same or different feature points, or other image aspects, to attempt to identify a type of item represented in the region. As discussed elsewhere herein, the region detection and analysis can be performed in parallel or as part of a single process step in other embodiments as well. For each region in which an item type has been determined, a trained machine learning model can be selected 510 that was trained using classified images of items of that type. The image data can be processed using that trained model to obtain a set of attributes and corresponding confidence values that are exhibited by the item as represented in the image data. These can include stylistic or visual attributes as discussed herein. If it is determined 512 that there are more regions then the process can continue until all regions are processed and attributes obtained. If no attributes, or fewer than a minimum number of attributes, can be determined for a specific region, then the region may be excluded from further consideration. Using the determined attributes and confidence values, a set of stylistically similar items can be determined 516, either that are similar to a single item or at least one of a set of items represented in the image data. Information or content for the similar items can then be provided, such as may include identifying information that can be used to locate related content or purchase a specific item, among other such options.

In some embodiments a set of attributes and values can be indicative of an item of a particular style, such as "bohemian" or "gala formal." In such cases, items may be represented that are not necessarily similar to the item of interest, but are of the same style. Similarly, as discussed in more detail elsewhere herein the system can look to items that were purchased together with items having specific attributes, or that were purchased or viewed by the same users, to identify items that might also be of interest to the user based on the style determination. Those recommendations might also be selected or limited using the various attributes identified for that style or set of items. Such an approach can enable accessories or even entire outfits to be suggested even though only a single item, or small number of items, may have been presented in a query image. Since the suggestions are based on similarity of attributes, these approaches have an advantage of being able to identify items of a new style or trend even though the trend itself may not yet be known or recognized to the system, and such an approach enables the system to learn these trends without manual intervention in at least some embodiments. As mentioned, initially manually annotated images can be used to train the models, but additional attributes and values can be learned over time as well.

For certain types of items, there may be prioritizations of attributes overall or for a specific user, etc. Thus, when determining similar items, the items can be ranked not only according to the attributes and values, but also taking into account the prioritizations and weightings, such that similarity of color might be weighted more heavily than length or shape for certain types of items, among many other such options. The number of attributes or values considered can also be reduced if not enough results can be obtained, or the thresholds or tolerances can be reduced, etc. Other metrics can be used to adjust the rankings as well, as may include customer rating, sales velocity, price, popularity, and the like.

In some embodiments a scalable graph database can be built that can enable users to store information in a graph model and use graph queries to enable users to easily navigate highly connected datasets. Graph databases can be purpose-built to store and navigate relationships. They can use graph structures such as nodes (data entities), edges (relationships), and properties to represent and store data. The relationships can be stored as first order citizens of the data model. This allows data in nodes to be directly linked, dramatically improving the performance of queries that navigate relationships in the data.

Relationships between entities (e.g. Item A, Color Blue) can be modeled via edges (e.g. Item A has property Color Blue). Weightedness is the ability to assign a specific numerical weight to each edge (e.g. Item A has a 60%/0.6 weight of property Color Blue). This lets data be modeled with greater granularity, which allows weighted queries to be performed to obtain more precise results, e.g. Find all items that has at least 0.3 weights of Color Blue, between 0.6-0.8 weights of Sleeve-length Long, and less than 0.2 weights of Pattern Floral. Furthermore, weightedness allows entities with more nuanced properties to be defined easily, e.g. Bohemian Dress has 0.8 weights of Hemlength Long, 0.5 weights of Pattern Floral and 0.3 weights of Neckline Round or 0.4 weights of Neckline V-Neck.

Figure 6:
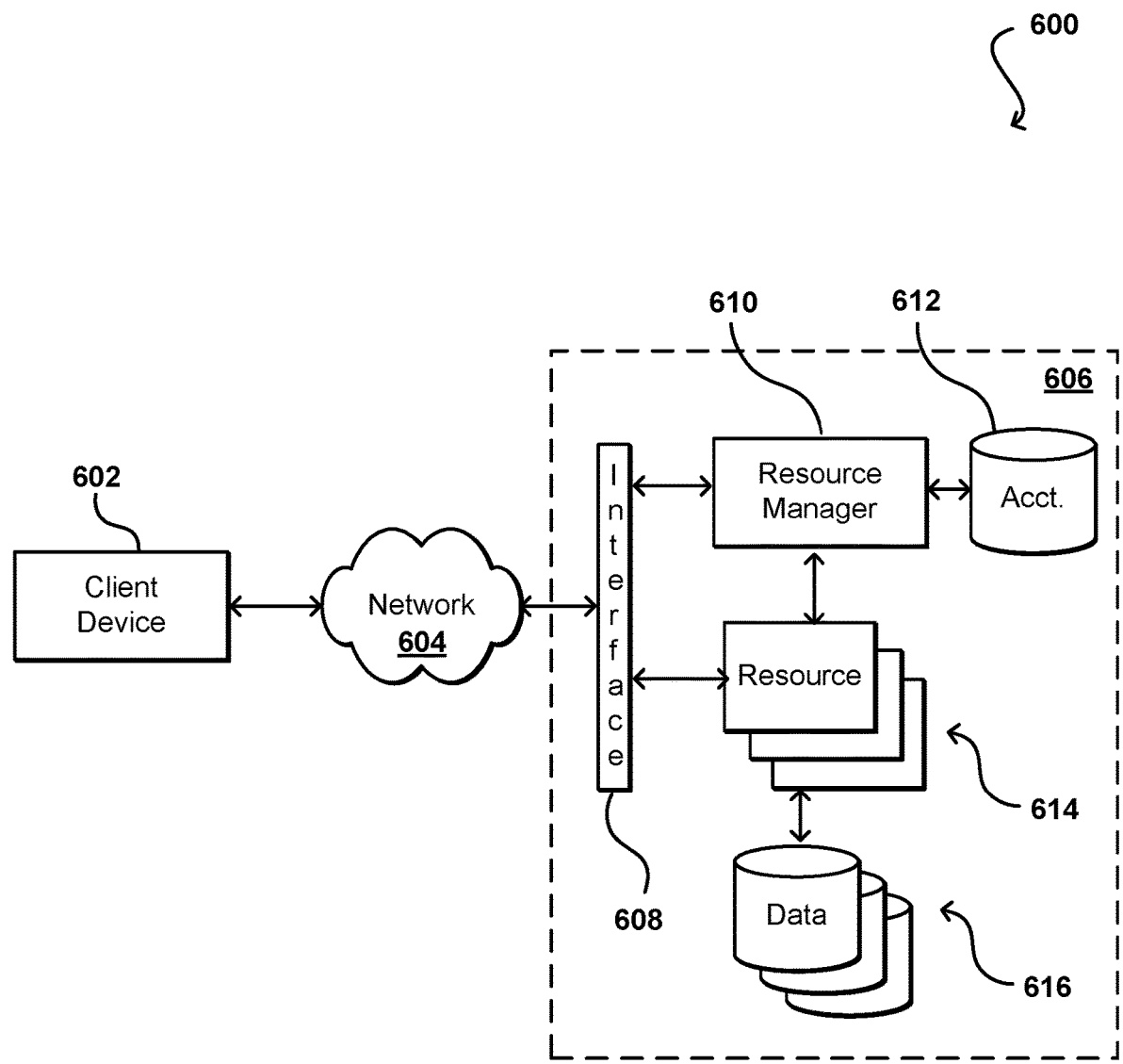
FIG. 6 illustrates an example system that can be used to implement aspects of the various embodiments.

FIG. 6 illustrates an example environment 600 in which aspects of the various embodiments can be implemented. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
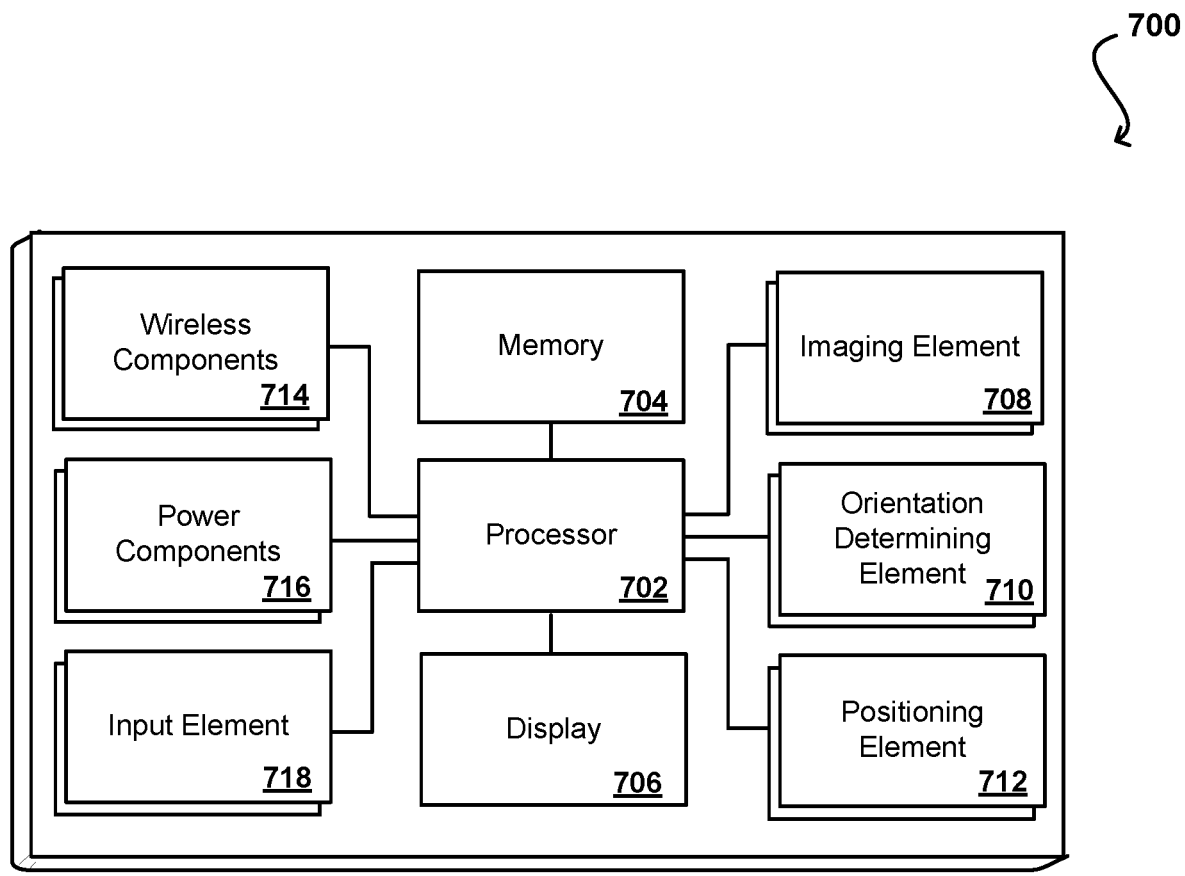
FIG. 7 illustrates example components of an example computing device that can be utilized in accordance with various embodiments.

FIG. 7 illustrates a set of basic components of an electronic computing device 700 that can be utilized to implement aspects of the various embodiments. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices. The device typically will include some type of display screen 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROW"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a query image including a representation of an item of interest;
locating the representation of the item of interest in the query image;
determining an item type of the item or interest;
processing the representation of the item using a trained machine learning model corresponding to the item type;
obtaining, from the trained machine learning model, a set of attributes and confidence values, the attributes including stylistics attributes exhibited by the representation of the item in the query image;
determining, using the set of attributes and confidence values, similarity scores for a set of similar items to the item of interest;
determining a ranking of the set of similar items, the ranking based at least in part on the similarity scores; and
providing content corresponding to at least a subset of the similar items, the subset based at least in part on the ranking.

2. The computer-implemented method of claim 1, further comprising:
processing the query image using a localizer algorithm to determine a region of the query image including the representation of the item of interest.

3. The computer-implemented method of claim 2, further comprising:
processing image data for the region using a trained classifier to determine the item type.

4. The computer-implemented method of claim 1, wherein the stylistic attributes include at least one of a color, a pattern, a cut, a length, a shape, a silhouette, a neckline, a hemline, or an occasion type of the item of interest.

5. The computer-implemented method of claim 1, further comprising:
training the trained machine learning model using a set of annotated images including items of the item type, wherein similarity of the items to the item of interest are able to be determined using a similarity determination algorithm accepting as input the attributes and confidence values.

6. A computer-implemented method, comprising:
processing an image using a trained model to produce a set of attributes representative of an item represented in the image, the attributes relating to at least one of visual attributes or stylistic attributes;
determining weighted relationships among the set of attributes for the item;
comparing the weighted relationships of the attributes against attribute data stored for items having been previously processed to identify a set of stylistically similar items having similar weighted relationships of attributes;

determining respective similarity scores for the set of stylistically similar items with respect to the item, the respective similarity scores based at least in part on the set of attributes;

ranking the stylistically similar items by the respective similarity scores;

determining a subset of the stylistically similar items based in part upon highest ranking by the respective similarity scores; and providing content associated with at least the subset of the stylistically similar items.

7. The computer-implemented method of claim 6, further comprising:

processing the image using a localizer algorithm to determine a region of the query image including the representation of the item.

8. The computer-implemented method of claim 7, further comprising:

processing image data for the region using a trained classifier to determine an item type for the item.

9. The computer-implemented method of claim 8, further comprising:

determining the weighted relationships by processing the representation of the item using a trained machine learning model corresponding to the item type.

10. The computer-implemented method of claim 6, further comprising:

training the trained machine learning model using a set of annotated images including items of the item type, wherein similarity of the items to the item of interest are able to be determined using a similarity determination algorithm accepting as input the attributes and confidence values.

11. The computer-implemented method of claim 6, wherein the stylistic attributes include at least one of a color, a pattern, a cut, a length, a shape, a silhouette, a neckline, a hemline, or an occasion type of the item of interest.

12. A system, comprising:

at least one processor; and memory storing instructions that, when executed by the at least one processor, cause the system to:

process an image using a trained model to produce a set of attributes representative of an item represented in the image, the attributes relating to at least one of visual attributes or stylistic attributes of the item;

determine weighted relationships among the set of attributes for the item;

compare the weighted relationships of the attributes against attribute data stored for items having been previously processed to identify a set of stylistically similar items having similar weighted relationships of attributes;

determine respective similarity scores for the set of stylistically similar items with respect to the item, the respective similarity scores based at least in part on the set of attributes;

rank the stylistically similar items by the respective similarity scores;

determine a subset of the stylistically similar items based in part upon highest ranking by the respective similarity scores; and provide content associated with at least a subset of the stylistically similar items.

13. The system of claim 12, wherein the instructions when executed further cause the system to:

process the image using a localizer algorithm to determine a region of the query image including the representation of the item.

14. The system of claim 13, wherein the instructions when executed further cause the system to:

process image data for the region using a trained classifier to determine an item type for the item.

15. The computer-implemented method of claim 14, further comprising:

determine the weighted relationships by processing the representation of the item using a trained machine learning model corresponding to the item type.

16. The system of claim 12, wherein the instructions when executed further cause the system to:

train the trained machine learning model using a set of annotated images including items of the item type, wherein similarity of the items to the item of interest are able to be determined using a similarity determination algorithm accepting as input the attributes and confidence values.

* * * * *